(No Model.)
F. W. KREMER.
SEWING MACHINE MOTOR.
No. 463,721. Patented Nov. 24, 1891.
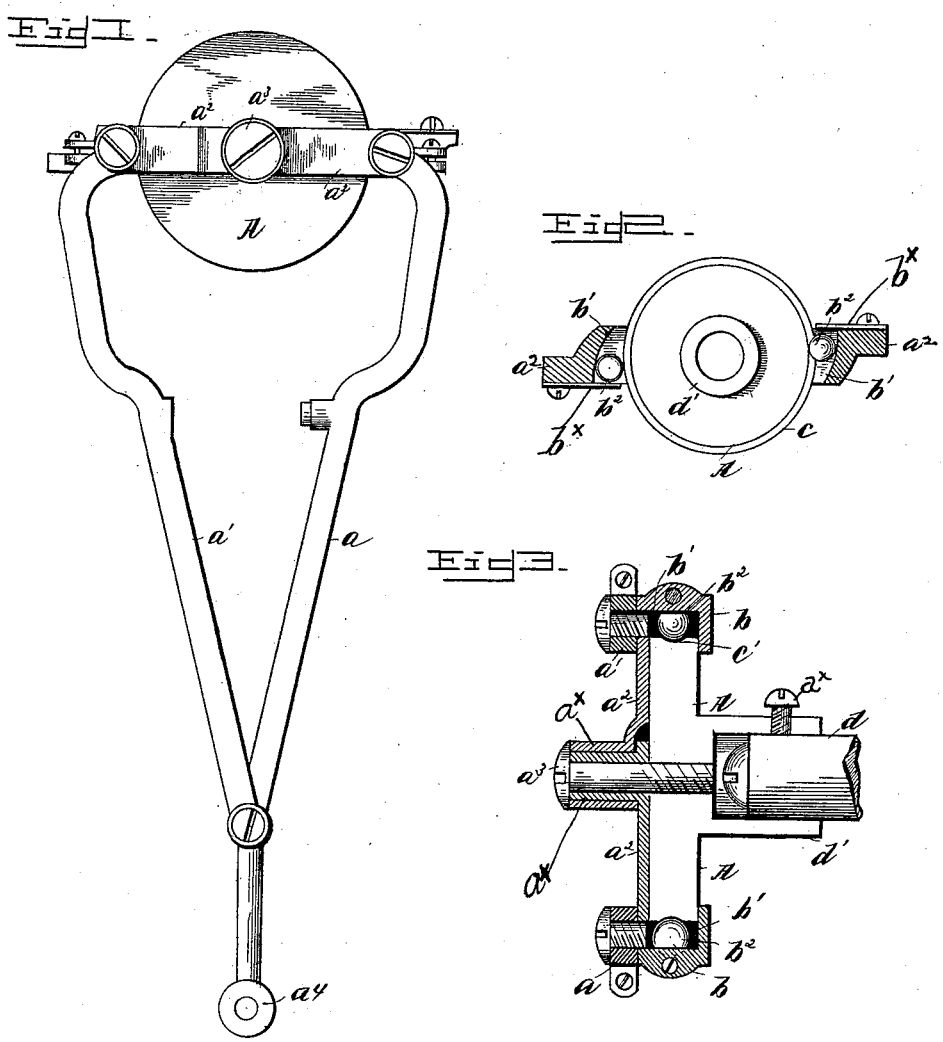

UNITED STATES PATENT OFFICE.

FRANKLIN W. KREMER, OF WADSWORTH, OHIO.

SEWING-MACHINE MOTOR.

SPECIFICATION forming part of Letters Patent No. 463,721, dated November 24, 1891.

Application filed July 7, 1890. Renewed July 16, 1891. Serial No. 399,777. (No model.)

*To all whom it may concern:*

Be it known that I, FRANKLIN W. KREMER, a citizen of the United States of America, residing at Wadsworth, in the county of Medina and State of Ohio, have invented certain new and useful Improvements in Sewing-Machine Motors, of which the following is a specification, reference being had therein to the accompanying drawings.

My invention pertains to certain new and useful improvements in machine-motors whereby a greater speed is produced with less power than it requires to run an ordinary machine, the breaking of needles in sewing-machines is avoided, and overcoming of the dead-center is effected, as will more fully appear from the following description and accompanying illustrations, in which—

Figure 1 is an elevation of my invention. Fig. 2 is a detailed partly side and partly sectional view of the same, and Fig. 3 is an enlarged partly sectional and partly plan view, principally of the parts disclosed in the latter figure.

In the embodiment of my invention I employ a driving-disk A, supported and secured upon the end of the driving-shaft $d$ of the machine, said disk having a sleeve-like extension $d'$, receiving said end, and provided with a set or holding screw $d^\times$, engaging said shaft. Two converging pitmen $a$ $a'$, one of which in practice is connected at $a^4$ to the treadle (not shown) of the machine, are pivoted at their diverging ends to the outer ends of two horizontal arms $a^2$ $a^2$, having at their inner ends sleeves $a^\times$ $a^\times$, the outer one fitting upon the inner, and the latter sleeve fitting upon a screw headed and threaded stud projecting centrally from the disk A. Arms $a^2$ $a^2$ have right-angular projections $b$ $b$ at their outer ends extending over the edge of the disk A, which edge has a groove $c'$ therein, serving as a guide for balls $b^2$ $b^2$. The projections $b$ $b$ have recesses $b'$ $b'$ therein, in which the balls $b^2$ $b^2$ are received, the larger ends of said recesses being closed by plates $b^\times$, held upon said arms $a^2$ by screws, and said recesses being smaller at one end than at the other, whereby when the disk is turned toward the smaller ends of the openings $b'$ $b'$ the balls are carried upward thereto by friction and the disk stopped from revolving. Thus as the treadle is tilted downward the arms $a^2$ $a^2$, through the pitmen $a$ $a'$, will be depressed at their outer ends, and one of the balls $b^2$ will impinge or grip upon the wheel or disk A, imparting motion thereto, in turn transmitting motion to the shaft $d$ of the wheel to be driven, the other ball serving as a retaining or holding pawl on the disk or wheel to prevent reverse motion of the latter. The opposite movement of the treadle will effect the elevation of the outer or ball-carrying ends of the arms $a^2$ $a^2$ to enable the propelling-ball to secure a fresh grip upon the disk to impart a second turn to the latter, and so on.

Having thus fully described my invention, what I claim, and desire to secure by Letters Patent, is—

The combination of the shaft, the disk having a sleeve-and-screw connection with said shaft and provided with a peripheral groove, the arms having at their inner ends sleeves fitting the outer one on the inner one and the latter sleeve fitting upon a screw headed and threaded stud projecting centrally from said disk, said arms also having right-angular projections at their outer ends extending over the periphery of the disk and having oppositely-converging recesses, the larger ends of which are closed by plates held upon the arms, the balls carried in said recesses and the peripheral groove of said disk, and the pitmen pivoted at their upper ends to the sides of said arms at their outer ends, said pitmen being connected together and one adapted to be connected to a treadle, substantially as set forth.

In testimony whereof I affix my signature in presence of two witnesses.

FRANKLIN W. KREMER.

Witnesses:
 JOHN F. WEH,
 AUGUSTUS ZEHRING.